Figure 3:
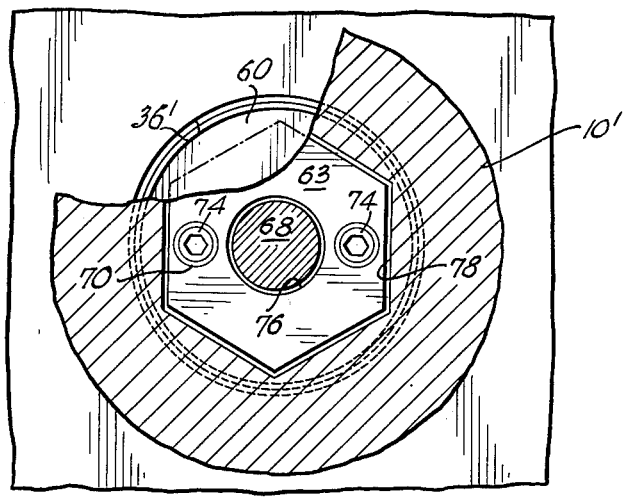

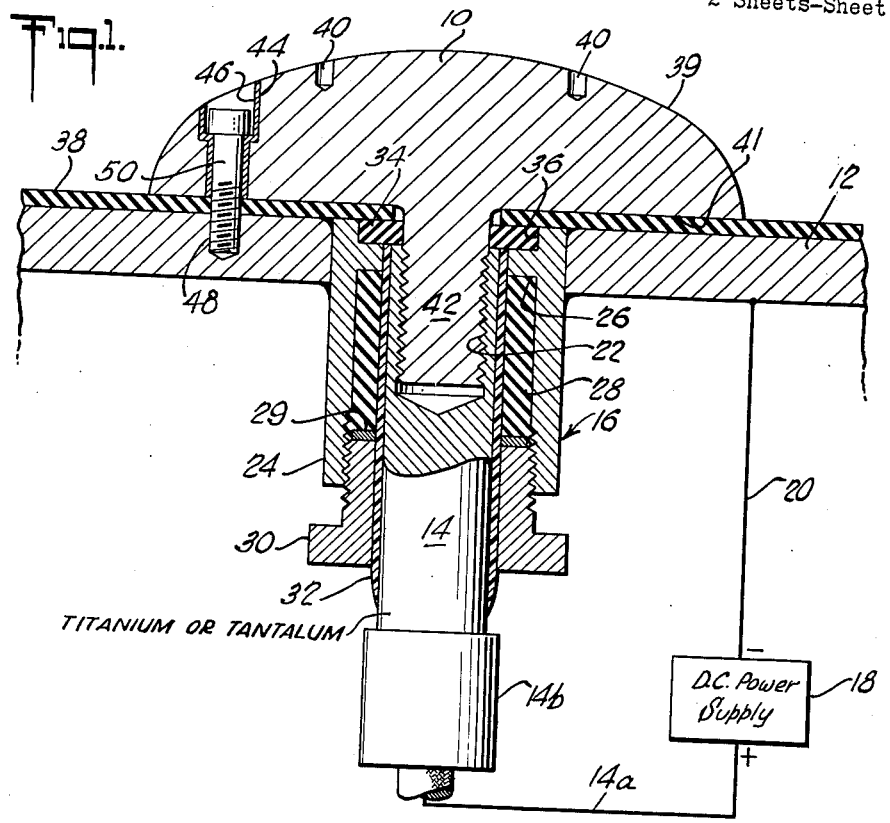
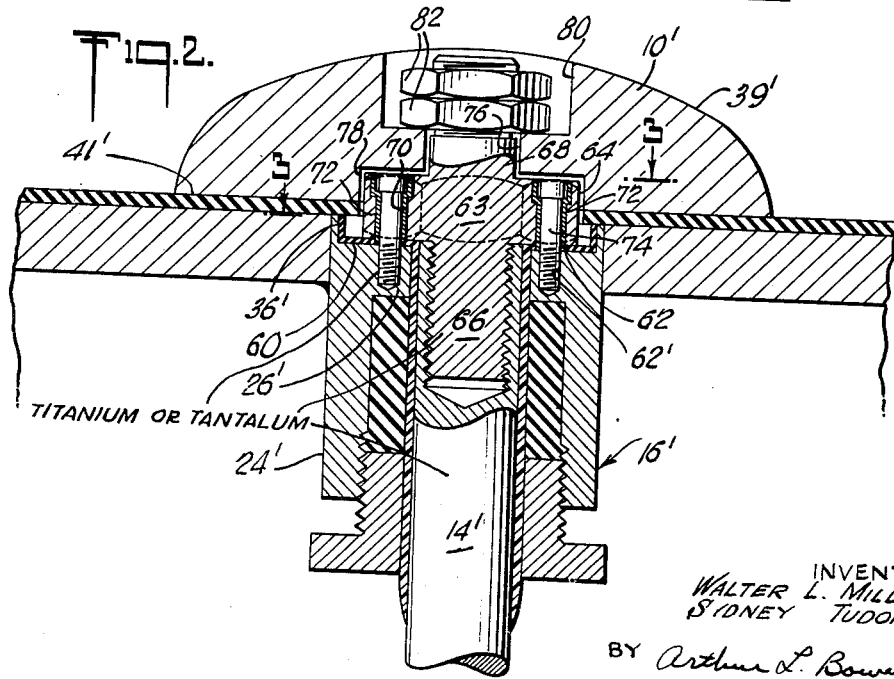

May 19, 1964 W. L. MILLER ETAL 3,133,873
ELECTROLYTIC ANODE AND CONNECTION
Filed June 23, 1961 2 Sheets-Sheet 2

INVENTORS
WALTER L. MILLER
SIDNEY TUDOR
BY Arthur L. Bowers
AGENT

United States Patent Office 3,133,873
Patented May 19, 1964

3,133,873
ELECTROLYTIC ANODE AND CONNECTION
Walter L. Miller, 160 Hendrickson Ave., Lynbrook, Long Island, N.Y., and Sidney Tudor, 102—17 64th Road, Forest Hills, N.Y.
Filed June 23, 1961, Ser. No. 119,244
1 Claim. (Cl. 204—196)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in impressed current anodes and anode holder structures for cathodic protection systems and more particularly to improvements relating to durability, maintenance, and replacement.

Metallic structures in contact with an electrolyte are subject to electrochemical corrosion. The electrochemical corrosion of ships' hulls immersed in seawater is one specific example of this problem. In part, corrosion of ships' hulls exposed to sea water is due to galvanic action. Galvanic action is the generation of an electric current between two different metals or between different sections of the same metal having unequal oxidation reduction potentials and immersed in an electrolyte. The metal with the lower oxidation reduction potential becomes more corroded than the other and is referred to as anodic or less noble in the electrochemical series. Two methods of protecting ships' hulls and other metallic structures from galvanic action are termed cathodic protection. One of the cathodic protection methods is sacrificial and involves the use of galvanic or sacrificial anodes more anodic than the metal structure to be protected and coupled in low resistance contact therewith and which are sacrificed or consumed by galvanic action but in the process protects the metal supporting structure from corrosion. The other of the cathodic protection methods is an activated method and includes the use of anodes mechanically joined to but electrically insulated from the metal structure to be protected and exposed to the electrolyte, and a direct current power supply whose positive terminal is electrically connected to the anodes and whose negative terminal is electrically connected to the metal structure for passing current through anodes, electrolyte, and metal structure in series. In the activated method, the anodes are termed impressed current anodes. Impressed current cathodic protection systems are becoming increasingly more popular on active ships' hulls because the anodes are of smaller bulk and less weigh.

On ships' hulls and on various other metal structures the impressed current anodes are subject to electrochemical deterioration, mechanical damage, and even complete destruction and loss through glancing impact. Impressed current anodes and their holders have been broken off at the electrical connection extending into and through the hull. All of the impressed current anode systems in use heretofore, particularly on ships, are deficient with respect to maintenance and repair. In order to replace an anode it has been necessary either to remove and replace the anode holder or to remove the anode along with its lead cable that penetrates the ship's hull. Such operations could not be performed by a diver and required drydocking of the ship.

An object of this invention is to provide an improved impressed current anode and anode connection of general application on metallic structures requiring cathodic protection but particularly for a ship's hull, wherein the anode can be removed and replaced by another while submerged in the electrolyte, e.g., underwater from a ship's hull by a diver using hand tools, and with as good electrical contact between the replacement anode and the anode connection as between the replaced anode and the anode connection, and without electrochemical corrosion in the anode connection either before, during, or after replacement of the anode, and wherein the anode connection is reparable even if the anode is broken away from the electrical connection. Where the anode connection extends through a ship's hull, the repair and or replacement of anodes are to be capable of being carried out without disturbing the watertight integrity of the ship's hull.

A further object is to provide an improved impressed current cathodic protection system that is more durable, more reliable, more practical, more efficient, and easier to service than systems in use heretofore.

Figure 4:
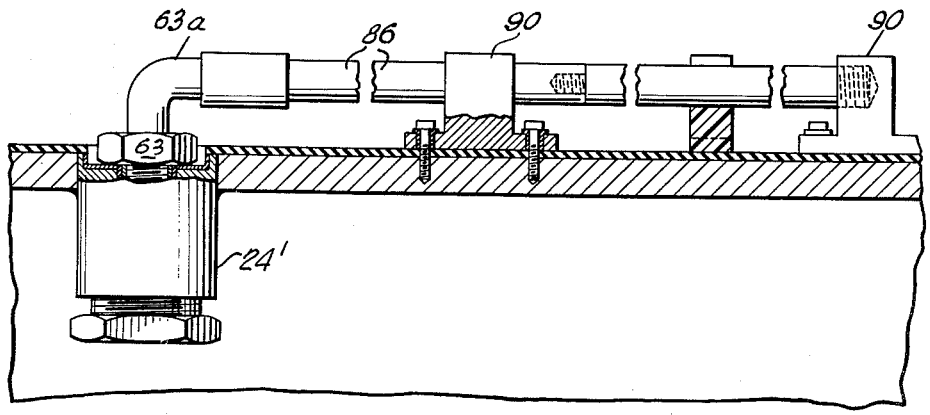

Other objects and many of the attendant advantages of this invention will be readily appreciated as the same becomes better understood by reference to the following detailed description when considered in connection with the accompanying drawings wherein:

FIG. 1 illustrates partly in section, partly in elevation, and partly schematically an impressed current cathodic protection system including an anode and anode connection constructed in accordance with the principles of this invention, FIG. 2 illustrates a modification of the anode structure and connection shown in FIG. 1, FIG. 3 is a section taken on line 3—3 of FIG. 2, and FIG. 4 is an illustration of an extension coupling similar to one included in the embodiment illustrated in FIG. 2 for mounting a rod-shaped anode.

In the embodiment shown in FIG. 1, an anode 10 is mounted on the hull 12 of a ship and electrical conductor means 14 and 14a and connector 14b insulated from the hull is electrically connected to and extends from the anode 10 into the ship through a watertight stuffing tube assembly 16 and is electrically connected to the positive terminal of a direct current power supply 18; a conductor 20 electrically connects the negative terminal of the power supply to the hull.

The conductor 14 is a rigid solid cylinder recessed longitudinally and internally threaded at one end 22; it is formed of a material having high anodic electrolytic resistance when the applied potential does not exceed the breakdown voltage for the material, and low electronic resistance on pressure contact with another conductor, and is substantially non-corrosive in seawater. Examples of such materials include commercially pure grade tantalum and titanium. For titanium, the potential at which the high anodic resistance breaks down is about 12 volts; for tantalum, it is about 130 volts.

The stuffing tube assembly 16 that mounts the conductor 14 in the hull includes a steel cylinder 24 welded at one end watertight to the perimeter of a hole extending through the hull and approximately flush with the outer surface of the hull. The cylinder 24 has an internal ring-like seat 26 located inward a short distance from that end of cylinder 24 welded in the hull and functions as a seat for packing material 28 surrounding a portion of the conductor 14. The opposite end of cylinder 24 is internally threaded and receives a washer 29 and a bronze gland nut 30 that compresses the packing material to form a water-tight seal. The conductor 14 is electrically insulated from the stuffing tube assembly by insulator wrapping or coating 32 on the conductor. The conductor 14 does not extend beyond the ring-like seat 26; it terminates short of the outer surface of the hull and is substantially fully protected from mechanical damage. A washer-shaped packing member 34 is disposed in the recess 36 between seat 26 and the adjacent end of the cylinder and affords additional protection on submarine installation. A dielectric shield or blanket 38 of neoprene or other suitable insulating material is cemented to the hull surface and covers an extended area around the axis of conductor 14 and serves the function of lengthening the path for electrolytic current flowing between anode and hull. The blanket 38 has a perforation in line with conductor 14.

Anode 10 has an approximately dome-shaped surface 39, recesses 40 in the surface 39 for receiving a spanner wrench, a flat surface 41 opposite the dome-shaped surface and bearing against the insulating blanket 38, an integral screw 42 extending axially from the center of the flat surface 41 and threaded into the end of conductor 14, a counterbored hole 44 near the periphery of the anode and parallel to its axis, and an insulation liner 46 press-fitted in the hole 44. After the anode is assembled with the conductor 14 and secured with a wrench, a shallow depth hole 48 may be drilled through the insulation blanket into the hull in line with the anode hole 44 and tapped and a metal or plastic screw 50 threaded into the hole 48 to secure the anode against loosening. The space above the screw may be plugged (not shown) to minimize turbulence. The anode 10 can be removed and replaced under water by a diver equipped with simple hand tools or air powered tools. In the event that the hole 44 in the replacement anode does not align with the hole 48 in the hull when tightened, the anode may be loosened, flat shim sections of insulating material may be disposed under the anode between its flat surface 41 and insulating blanket 38 and then the anode may be retightened till the holes 44 and 48 are in line. Screw 50 is not essential to the system; if it cannot be replaced by the diver it can be omitted or another locking arrangement may be substituted. The conductor 14 is unaffected by exposure to the sea water during anode replacement; if some sea water remains trapped in conductor 14 after the anode is replaced, it causes no difficulty. If the anode is sheared off the hull by a glancing impact, e.g., with debris, conductor 14 is protected against damage by the recessed arrangement of the conductor end. The part of an anode remaining attached in the conductor 14 when the anode is sheared off the hull, can be removed under water by a diver using air driven tools and a replacement anode installed without any need for machining operations and without disturbing the watertight integrity of the hull. Anode 10 may be made from various well-known cathodic protection anode materials.

In the structural arrangement illustrated in FIG. 1, the conductor 14 may be constructed with the threaded male coupling member and the anode portion 42 may be formed with the threaded female coupling.

In the modification shown in FIG. 2, there is provided a stuffing tube assembly 16', conductor 14' and anode 10' similar to the corresponding elements in the embodiment shown in FIG. 1. In FIG. 2, the recess 36' in the end of the cylinder 24' of the stuffing tube assembly 16' seats a cup-like, rigid, electrical insulating member 60 press-fitted in place. A hole 62 extends through the insulating member 60 and part way through the ring-shaped seat 26', parallel to the axis of the stuffing tube assembly. The hole 62 through the insulator 60 is enlarged, as by a counterbore, and the hole in the ring 26' is tapped.

The conductor 14' is provided with an extension 63 having a hexagonal central portion 64, of somewhat smaller maximum diameter than the insulator lined recess 36' and studs 66 and 68 extending oppositely from hexagonal portion 64 all axially in line. Stud 66 is of a length, diameter and has a thread size to screw completely into and join in low electrical resistance contact with the conductor 14'. Stud 68 is threaded adjacent its free end and its diameter and length are selected for proper assembly with the anode 10'. The hexagonal portion 64 is formed with a plurality of bolt holes 70 located on a circle of the same radius as the radius from the axis of cylinder 24' to tapped hole 62. Each of the holes 70 are lined with rigid electrical insulating liners 72 press-fitted in place and of larger inside diameter than the thread diameter in tapped hole 62. After the conductor 14' is assembled in the stuffing tube assembly, the extension 63 is tightly assembled in recessed threaded end of the conductor 14' with one of the holes 70 in line with tapped hole 62'. A bolt 74 of tantalum or titanium extends through hole 70 into tapped hole 62' and secures the extension 63 against rotation.

Anode 10' is formed with a central hole 76 extending through the center of the dome-shaped surface 39' and the center of the flat surface 41' terminates at the flat surface end in an hexagonal recess 78 of slightly larger diameter than the hexagonal portion 64 of the conductor extension 63 and of sufficient depth to completely receive at assembly the part of the hexagonal portion 64 that extends beyond the blanketed hull surface; the hole 76 terminates at the domed surface end in a circular recess 80 of sufficient diameter to receive a socket wrench for securing and removing fastening nuts 82 when the anode 10' is assembled on the extension 63. The length of the stud 68 is designed in conjunction with the center thickness of the anode 10 so as to terminate at or just short of the anode surface at assembly. The recess 80 may be covered with a removable cap to minimize turbulence. Anode 10' is locked against rotation and loosening by hexagonal portion 64 and bolt 74.

In FIG. 4 there is shown a right angle coupling 63a similar in construction to and serving the same function as extension 63 in FIG. 2 for threaded assembly with an elongated rod-shaped anode 86 that may be braced at spaced points along its length by supports of insulating material secured to the hull or by metal fittings 90 of material selected from the same class as conductor 14 and secured to but insulated from the hull.

Since the conductor terminal joined to the anode is of a material non-corrosive in seawater the entire cathodic protection system is more durable and more reliable than those available heretofore. If exposed to the electrolyte either accidently or intentionally, the terminal of conductor 14' suffers no deterioration. When reconnected to an anode a low resistance path between power supply and anode is re-established. The conductor termination is protected from damage by the cylinder of the stuffing tube assembly. Even if the anode is subjected to destructive blows and sheared off, another anode can be connected to the conductor by a diver using simple tools.

Obviously many modifications and variations of the present invention are possible in the light of the above teachings. It is therefore to be understood that within the scope of the appended claim the invention may be practiced otherwise than as specifically described.

We claim:

An impressed current cathodic protection system for a metallic ship's hull which hull is provided with an opening therethrough below the waterline which comprises an electrical terminal of a material of the group consisting of tantalum and titanium, a free end of said terminal extending from within the hull into said hull opening but terminating short of the outer surface of said hull for shielding from mechanical damage and hermetically sealed therein, said free end of said terminal having an endwise threaded recess, an anode having a hole therethrough and a polygonal recess coaxial with and at one end of the hole and substantially larger than the hole, means for detachably coupling together said anode and the free end of said terminal and providing a low electrical resistance path therebetween, said coupling means being of the same material as said terminal, said coupling means having a polygonal central portion geometrically similar to the polygonal recess in the anode and nested in the recess for preventing relative rotation of said coupling means and anode relative to an axis through the hole in the anode, said coupling means further including opposed externally threaded studs and substantially coaxial with the polygonal portion and each other, one of said studs being threaded into the threaded recess in said terminal and the other stud extending through the hole in said anode, threaded means threaded on the end of the stud extending through the hole in the anode and connecting the anode to the coupling means and supporting said anode on the exterior side of said hull adjacent the outer surface of the hull, insulation separating said anode and hull, and means securing said coupling means against rotation in said terminal.

References Cited in the file of this patent

UNITED STATES PATENTS

| | | |
|---|---|---|
| 2,776,941 | Wagner | Jan. 8, 1957 |
| 2,826,543 | Sabins | Mar. 11, 1958 |
| 2,910,419 | Preiser et al. | Oct. 27, 1959 |
| 2,934,485 | Sabins | Apr. 26, 1960 |
| 2,947,680 | Preiser | Aug. 2, 1960 |
| 2,949,417 | Preiser et al. | Aug. 16, 1960 |
| 3,038,849 | Preiser | June 12, 1962 |
| 3,043,765 | Bryan et al. | July 10, 1962 |

FOREIGN PATENTS

| | | |
|---|---|---|
| 204,781 | Great Britain | Oct. 8, 1923 |